United States Patent
Jha et al.

(10) Patent No.: US 11,151,478 B2
(45) Date of Patent: Oct. 19, 2021

(54) ENHANCED LEARNING WITH FEEDBACK LOOP FOR MACHINE READING COMPREHENSION MODELS

(71) Applicant: VMWARE, INC., Palo Alto, CA (US)

(72) Inventors: Ritesh Jha, Bangalore (IN); Priyank Agarwal, Bangalore (IN); Vaidic Joshi, Bangalore (IN); Suchit Dhakate, Bangalore (IN); Jasmine Ejner, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 337 days.

(21) Appl. No.: 16/423,201

(22) Filed: May 28, 2019

(65) Prior Publication Data

US 2020/0320429 A1    Oct. 8, 2020

(30) Foreign Application Priority Data

Apr. 5, 2019 (IN) .............................. 201941013851

(51) Int. Cl.
  *G06N 20/00*   (2019.01)
  *G06F 40/40*   (2020.01)
  *G06F 9/455*   (2018.01)
(52) U.S. Cl.
  CPC ............. *G06N 20/00* (2019.01); *G06F 40/40* (2020.01); *G06F 9/45541* (2013.01)

(58) Field of Classification Search
  CPC .......... G06N 20/00; G06N 3/08; G04F 40/40; G04K 9/6256
  See application file for complete search history.

(56) References Cited

U.S. PATENT DOCUMENTS

| | | | |
|---|---|---|---|
| 6,119,112 A * | 9/2000 | Bush ........................ | G06N 3/08 706/25 |
| 2018/0137433 A1* | 5/2018 | Devarakonda ......... | G16H 10/20 |
| 2019/0228099 A1* | 7/2019 | Bajaj ........................ | G06N 3/08 |
| 2020/0034750 A1* | 1/2020 | Ritter ...................... | G06N 20/00 |

* cited by examiner

*Primary Examiner* — Eric J Yoon
(74) *Attorney, Agent, or Firm* — Patterson + Sheridan, LLP

(57) ABSTRACT

The present disclosure provides an approach for training a machine learning model by first training the model on a generic dataset and then iteratively training the model on "easy" domain specific training data before moving on to "difficult" domain specific training data. Inputs of a domain-specific dataset are run on the generically-trained model to determine which inputs generate an accuracy score above a threshold. The inputs with an accuracy score above a threshold are used to retrain the model, along with the corresponding outputs. The retraining continues until all domain specific dataset has been used to train the model, or until no remaining inputs of the domain specific dataset generate an accuracy score, when run on the model, that is above a threshold.

20 Claims, 2 Drawing Sheets

ENHANCED LEARNING WITH FEEDBACK LOOP FOR MACHINE READING COMPREHENSION MODELS

RELATED APPLICATIONS

Benefit is claimed under 35 U.S.C. 119(a)-(d) to Foreign Application Serial No. 201941013851 filed in India entitled "ENHANCED LEARNING WITH FEEDBACK LOOP FOR MACHINE READING COMPREHENSION MODELS", on Apr. 5, 2019, by VMware, Inc., which is herein incorporated in its entirety by reference for all purposes.

BACKGROUND

Machine Reading Comprehension (MRC) models are machine learning models that are used to autonomously understand written context and, for example, answer an end-user's questions. MRC models find application in various natural language processing (NLP) products in which a user can type a query and the model replies back with an accurate and precise answer. An example of such a product is a chatbot that has the ability to understand and communicate with a user in a natural language like English, German, etc.

As known in the art, MRC models are trained using input-output pairs. An MRC model is trained using the pairs such that for a given input, the correct output of the algorithm should be the associated output from the input-output pair. However, sometimes certain input-output pairs cannot be understood by an MRC model. If an MRC model is trained on such input-output pairs, the MRC model may become confused, and the output of the MRC model may become less accurate than before the training. Also, the order in which the input-output pairs are presented to an MRC model for training may result in a low accuracy of the MRC model.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for training a machine learning model by first training the model on a generic dataset and then iteratively training the model on "easy" domain specific training data before moving on to "difficult" domain specific training data. In an embodiment, an "easy" question means that the MRCL model is able to answer the question correctly based on the previous training, while a "difficult" question is a question the MRC model is not able to answer correctly based on prior training. Inputs of a domain-specific dataset are run on the generically-trained model to determine which inputs generate an accuracy score above a threshold. The subset of the domain specific dataset that generates an accuracy score above a threshold is then used to retrain the model. The training continues until all of the domain specific dataset has been used to train the model, or until no remaining inputs of the domain specific dataset generate an accuracy score, when run on the model, that is above a threshold. The practical application of the present disclosure is the novel and unconventional method of training a machine learning model, the training specifically of a machine learning comprehension model, the training more specifically of a question-answer machine reading comprehension model, and/or automatically generating an answer by the model in response to receiving a question. Embodiments of the present disclosure improve the technical field of machine learning by providing more accurate generation of an answer by the model in response to receiving a question.

Figure 1:
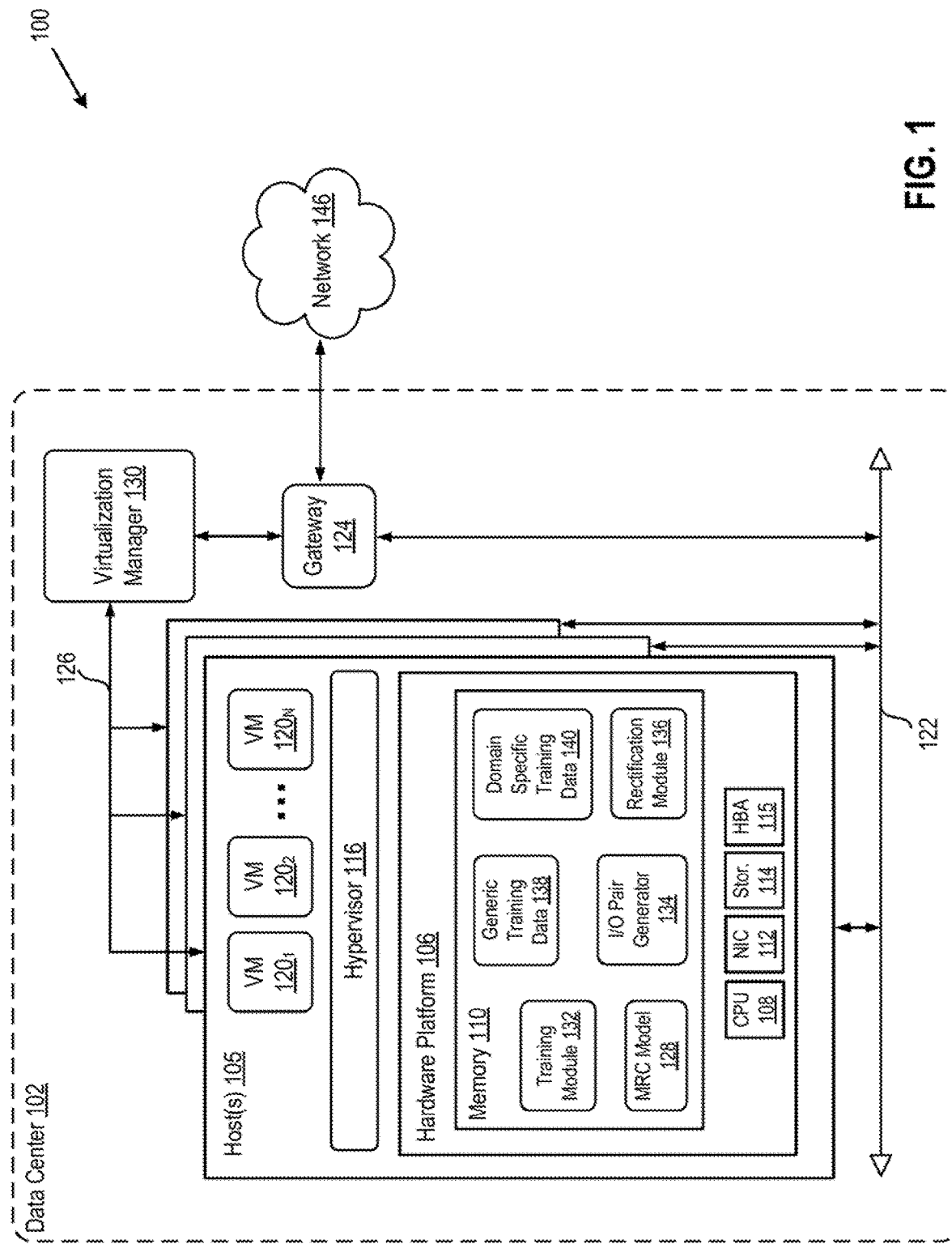
FIG. 1 depicts a block diagram of a computer system in which one or more embodiments of the present disclosure may be utilized, according to an embodiment.

FIG. 1 depicts a block diagram of a computer system 100 in which one or more embodiments of the present disclosure may be utilized, according to an embodiment. Computer system 100 includes data center 102 that may be connected to a network 146 through a gateway 124. Network 146 may be, for example, a direct link, a local area network (LAN), a wide area network (WAN) such as the Internet, another type of network, or a combination of these.

Data center 102 includes host(s) 105, a gateway 124, a management network 126, and a data network 122. Optionally, data center 102 includes components for virtualization, such as a virtualization manager 130 that may support virtual machines $120_1$ to $120_N$ (collectively referred to as VMs 120 and individually referred to as VM 120) that run concurrently on a host 105.

Each host 105 may be constructed on a server grade hardware platform 106, such as an x86 architecture platform. For example, hosts 105 may be geographically co-located servers on the same rack. Hardware platform 106 of each host 105 may include components of a computing device such as one or more processors (CPUs) 108, system memory 110, a network interface 112, storage system 114, a local host bus adapter (HBA) 115, and other I/O devices such as, for example, a mouse and keyboard (not shown).

CPU 108 is configured to execute instructions, for example, executable instructions that perform one or more operations described herein and that may be stored in memory 110 and in storage 114. Network interface 112 enables host 105 to communicate with other devices via a communication medium, such as network 122 or network 126. Network interface 112 may include one or more network adapters, also referred to as Network Interface Cards (NICs). Storage system 114 represents local persistent storage devices (e.g., one or more hard disks, flash memory modules, solid state disks, and/or optical disks). HBA 115 couples host 105 to one or more external storages (not shown), such as a storage area network (SAN). Other external storages that may be used include network-attached storage (NAS) and other network data storage systems, which may be accessible via NIC 112.

System memory 110 is hardware allowing information, such as executable instructions, configurations, and other data, to be stored and retrieved. Memory 110 is where programs and data are kept when CPU 108 is actively using them. Memory 110 may be volatile memory or non-volatile memory. Volatile or non-persistent memory is memory that needs constant power in order to prevent data from being erased. Volatile memory describes conventional memory, such as dynamic random-access memory (DRAM). Non-volatile memory is memory that is persistent (non-volatile). Non-volatile memory is memory that retains its data after having power cycled (turned off and then back on). Nonvolatile memory is byte-addressable, random access nonvolatile memory.

FIG. 1 shows several modules or datasets running or located within memory 110, including MRC model 128, training module 132, input/output (I/O) pair generator 134, rectification module 136, generic training data 138, and domain specific training data 140. Although these modules and datasets are shown as being located in memory 110, they may be located anywhere accessible to host 105, directly or indirectly. For example, they may be located in storage 114, in a storage or memory external to host 105 within data center 102, or in a storage or memory outside of data center 102. Although training module 132, I/O pair generator 134, and rectification module 136 are shown as three separate modules, all three may be a part of the same module. For example, training module 132 may perform functions of all three modules.

MRC model 128, training module 132, input/output (I/O) pair generator 134, and rectification module 136 may run directly on one of hosts 105, or may execute within one or more of VMs 120. Generic training data 138 and/or domain specific training data 140 may be stored outside of data center 102, and may be transmitted to training module 132 through network 146.

MRC model 128 is a natural language machine learning model trained on pair-wise inputs and outputs. Inputs may be, for example, questions. The outputs, may be, for example, answers. The questions and answer are arranged in pairs such that each question is associated with an answer. Each question and answer is part of a question and answer pair. For example, the question or input, "What is the capital of United States?" may be associated with the answer or output, "Washington, D.C." MRC model 128 may be an algorithm or a combination of algorithms, such as Bi-Directional Attention Flow (BIDAF), R-NET, or Dual Ask-Answer Network for Machine Reading Comprehension Network (DAANet).

Training module 132 is a module that manages the overall training of MRC model 128. For example, training module 132 may control the flow of training steps described in FIG. 2, below.

I/O pair generator 134 is an automatic generator of pair-wise input-output data, and the data can be used to train MRC model 128. For example, I/O pair generator 134 may obtain data, such as the text of a book describing art history, and can then create input-output (e.g., question-answer) pairs that can be used to train MRC model 128. Following the example, I/O pair generator may create an input-output pair consisting of the question "Who painted Starry Night?" and the answer, "Vincent van Gogh." I/O pair generator 134 may be, for example, a two-stage synthesis network (SynNet).

Rectification module 136 is a module that corrects or rectifies automatically-generated input-output pairs, such as input-output pairs generated by I/O pair generator 134. Automatically generated input-output pairs may contain grammatical or semantical errors, such as improper grammar or repetition of words or phrases. For example, an automatically generated input question may be, "In what year was year was year was the National Basketball Association Association founded?" and the answer may be, "1946." Rectification module 136 may then rectify the question by deleting extra words and phrases, resulting in, "In what year was the National Basketball Association founded?" The same type of rectification may be applied to answers as well as to questions. Rectification module 136 may for example, a natural language processing (NLP) parser and/or semantic analyzer. The NLP parser and/or analyzer may utilize NLP libraries, such as the Python® Natural Language Toolkit (NLTK) library.

Generic training data 138 is a dataset of input-output training pairs that is used to train MRC model 128 on knowledge that spans multiple knowledge domains. A knowledge domain is for example, sports, geography, art, science, nutrition, user guides of company X, etc. Generic training data 138 may be used to train MRC model 128 on the general structure of language. General training data 138 may be used to train MRC model 128 on general knowledge spanning a plurality of knowledge domains, with question-answer pairs regarding names of famous people, capitals of countries, etc. Generic training data 138 is broader in information categories covered than domain specific training data 140. Generic training data 138 may be, for example, the Stanford Question Answering Dataset (SQuAD).

Domain specific training data 140 is a dataset of input-output training pairs that is used to train MRC 128 on knowledge that is specific to a single knowledge domain. For example, domain specific training data 140 may be question-answer pairs regarding policies of company X or regarding product user guides of company X. Domain specific training data 140 may be input-output (e.g., question-answer) pairs generated by I/O pair generator 134 and rectified by rectification module 136.

Host 105 may be configured to provide a virtualization layer or virtualization system/software, also referred to as a hypervisor 116, that abstracts processor, memory, storage, and networking resources of hardware platform 106 into multiple VMs 120. Hypervisor 116, through abstraction, implements or emulates virtualized components of VMs 120. Hypervisor 116 is logically interposed between VMs 120 and hardware platform 106. One example of hypervisor 116 is a VMware ESXi™ hypervisor provided as part of the VMware vSphere® solution made commercially available from VMware, Inc. of Palo Alto, Calif. Hypervisor 116 may run on top of the operating system in host 105 or directly on hardware platform 106 of host 105. Although certain aspects are described with respect to VMs, it should be noted that the techniques discussed herein may similarly be applied to other types of virtual computing instances (VCIs) such as containers.

Virtualization manager 130 communicates with hosts 105 via a network, shown as a management network 126, and carries out administrative tasks for data center 102 such as managing hosts 105, managing local VMs 120 running within each host 105, provisioning VMs, migrating VMs from one host to another host, and load balancing between hosts 105. Virtualization manager 130 may be a computer program that resides and executes in a central server in data center 102 or, alternatively, virtualization manager 130 may run as a VM 120 in one of hosts 105. One example of a virtualization manager is the vCenter Server™ product made available from VMware, Inc.

It should be noted that hypervisor 116 and VMs 120 are an optional feature of host 105. Rather than a hypervisor, host 105 may run a standard operating system, such as Microsoft Windows or Linux.

Gateway 124 (e.g., executing as a virtual appliance) provides hosts 105, VMs 120, and other components in data center 102 with connectivity to network 146 used to communicate with remote data center 104. Gateway 124 may manage external public IP addresses for VMs 120 and route traffic incoming to and outgoing from data center 102 and provide networking services, such as firewalls, network address translation (NAT), dynamic host configuration protocol (DHCP), and load balancing. Gateway 124 may use data network 122 to transmit data network packets to hosts 105. Although networks 122 and 126 are shown as separate entities, they may be implemented by shared physical networking components.

Figure 2:
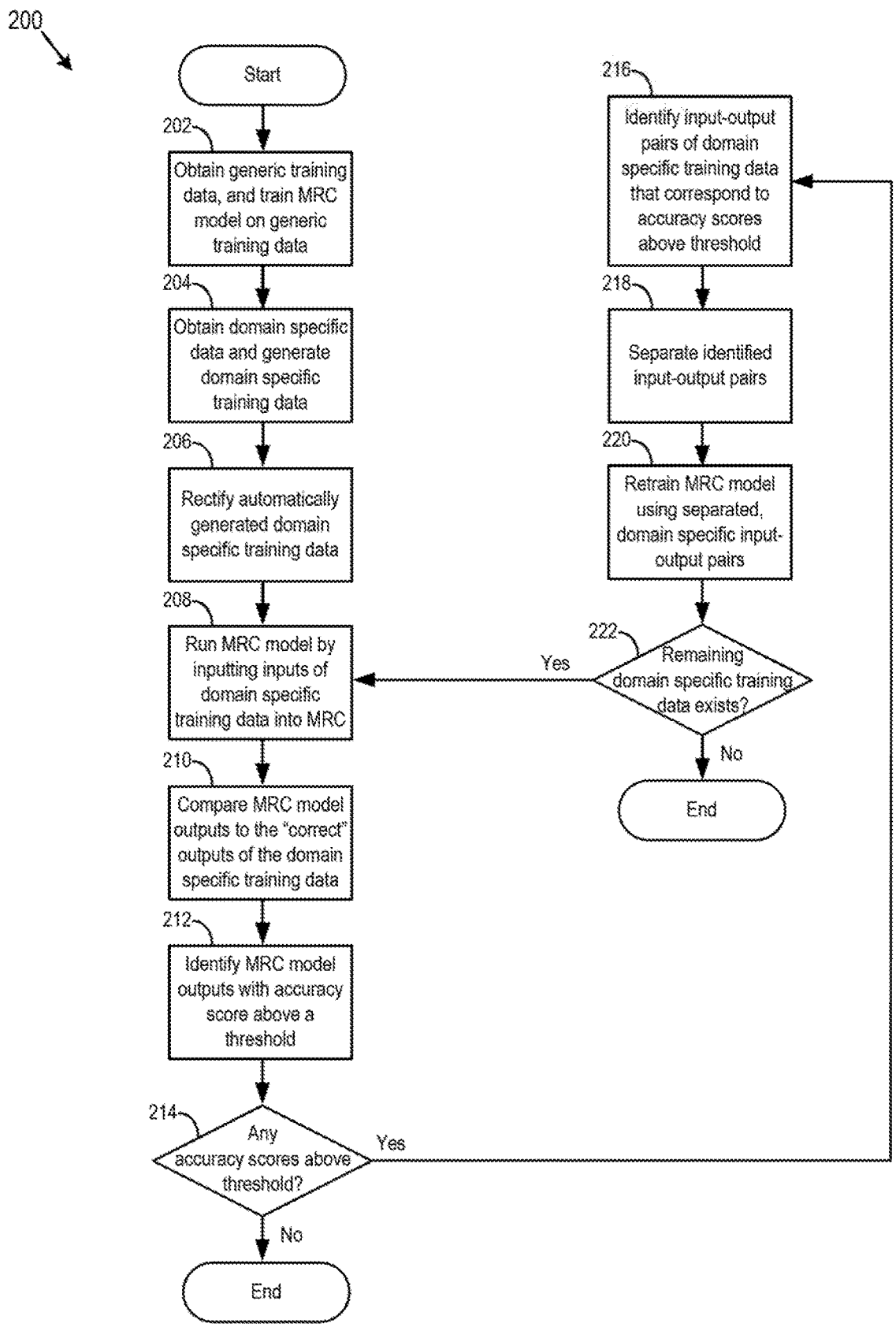
FIG. 2 depicts a flow diagram of a method of training a machine reading comprehension model, according to an embodiment.

FIG. 2 depicts a flow diagram of a method 200 of training MRC model 128, according to an embodiment. Method 200 may be performed by training module 132. At block 202, training module 132 obtains generic training data 138, and then training module 132 trains MRC module 128 using generic training data 138.

At block 204, training module 132 obtains domain specific data (not shown) and passes this data to I/O pair generator 134. I/O pair generator 134 parses the obtained domain specific data and generates unrectified domain specific training data 140. For example, training module may obtain a set of user guides of products of company X, and I/O pair generator may then use the user guides to generate a set of questions and answers pertaining to the user guides.

At block 206, rectification module 136 obtains the unrectified domain specific training data 140 generated at block 204 and rectifies the text of input-output pairs of the unrectified domain specific training data 140. The rectification includes, for example, correcting grammar and removing repetitions of words and phrases.

At block 208, the trained MRC model 128 is run using inputs ("training inputs") of domain specific training data 140 so as to generate outputs ("MRC outputs") by MRC model 128 based on training so far.

At block 210, outputs generated at block 208 by MRC model 128 are compared to outputs of domain specific training data 140. The comparison may be performed using a similarity or accuracy score. The accuracy score may reflect a degree of similarity between (a) MRC model outputs of block 210, and (b) outputs of domain specific training data 140 that correspond to inputs used to run MRC model 128 at block 208. The accuracy score may take into account both recall and precision, as known in the art, of MRC model outputs generated at block 208. The score may be, for example, an F1-Score obtainable by the formula:

$$F = 2 * \frac{(\text{recall} * \text{precision})}{(\text{recall} + \text{precision})}$$

Recall and precision may be defined, for example, by the below formulas, wherein brackets { } signify a set, the ∩ symbol signifies the intersection of the sets, and vertical bars || signify an absolute value. Also, wherein, {relevant words} is the set of words in the output (e.g., answer) from the input-output pair (e.g., question-answer pair) of domain specific training data 140. And wherein {retrieved words} is the set of words in the output (e.g., answer) of MRC model 128.

$$\text{Precision} = \frac{|\{\text{relevant words}\} \cap \{\text{retrieved words}\}|}{\{\text{retrieved words}\}}$$

$$\text{Recall} = \frac{|\{\text{relevant words}\} \cap \{\text{retrieved words}\}|}{\{\text{relevant words}\}}$$

At block 212, training module 132 identifies outputs of MRC model 128 which resulted in an accuracy score past or satisfying a certain threshold. For example, the outputs identified may be more than a threshold such as 0.6, 0.7, or 0.8.

At block 214, training module 132 determines whether any outputs of MRC model 128 resulted in an accuracy score above the threshold. If not, then the training is ends. If so, then method 200 proceeds to block 216.

At block 216, the outputs of MRC model 128 identified at block 212 are matched to the inputs of domain specific training data 140. The matched inputs are then matched to their pair-wise outputs to identify input-output pairs of domain specific training data 140 whose inputs caused outputs of MRC model 128 that achieved an accuracy score above the threshold ("a subset of pair-wise inputs and outputs of the domain specific dataset"). These are input-output pairs that MRC model 128 (a) is close to understanding, but does not yet understand, or (b) already understands. Training MRC model 128 on these pairs would therefore not be "confusing" to MRC model 128.

At block 218, the input-output pairs of domain specific training data 140 identified at block 216 are separated from domain specific training data 140. For example, the identified pairs may be placed into a separate training file (not shown) and then deleted from domain specific training data 140.

At block 220, MRC model 128 is retrained using additional data. Specifically, MRC model 128 is retrained using separated, domain specific input-output pairs of block 218. After block 220, MRC model 128 is trained on all data on which MRC model 128 had been trained before block 220, and also on data separated at block 218.

At block 222, training module 132 determines whether there is any domain specific training data 140 on which MRC model 128 has not yet been trained. If not, then method 200 ends. If domain specific training data 140 on which MRC model 128 has not been trained remains, then method 200 returns to block 208.

Method 200 continues to iterate between blocks 208 and 222 until either (a) MRC model 128 is unable to generate outputs using remaining inputs of domain specific training data 140, such that the outputs have an accuracy score above the threshold (see block 214), or (b) MRC model 128 becomes trained on all domain specific training data 140 (see block 222). For example, if above method 200 returns to block 208 from block 222 for a second training iteration, then at block 208 training module use all remaining inputs from domain specific training data to run MRC model 128. The "remaining" inputs are those that were not separated from domain specific training data 140 at block 218, and the pair-wise remaining input-output pairs of domain specific training data 140 may be considered a "second domain specific dataset." The remaining inputs may be considered "second training inputs" and corresponding remaining outputs may be considered "second training outputs." Because MRC model 128 has been trained on additional data (see block 220) since the first iteration of block 208, then MRC model 128 may be able to generate new outputs ("second MRC outputs") to remaining inputs of domain specific training data 140 that have an accuracy score above the threshold. The pair-wise input-outputs of domains specific training data 140 that correspond to the MRC model 128 outputs with an accuracy score above the threshold will then be used as additional data to retrain MRC model 128 at block 220. The iterations may continue to generate "third" variations of the above discussed "second" data, as discussed above.

If method 200 ends after block 222, then MRC model 128 has learned and "understood" all training data from domain specific training data 140. If method 200 ends at block 214, then MRC model 128 has not been trained on all data from domain specific training data 140, and the remaining data may have resulted in "confusing" MRC model 128 if MRC model had been trained on that remaining data. Confusion would have resulted in overall less accurate final results when deployed for a practical application. The practical application may be, for example, providing as input a question to trained MRC model 128, and receiving in response, an answer to the question, wherein the answer may be considered correct or helpful to the receiving entity. The question may be transmitted from a client device (not shown) located outside of data center 105, through network 146, to trained MRC model 128 running on one of hosts 105 and/or VMs 120.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system— computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of training a machine reading comprehension (MRC) model, the method comprising:
    training the MRC model on a generic dataset;
    running the MRC model using domain-specific training inputs from a domain-specific dataset to obtain MRC outputs, the domain-specific dataset comprising a plurality of pair-wise inputs and outputs, the pair-wise inputs and outputs comprising the domain-specific training inputs and domain-specific training outputs arranged in a pair-wise manner;
    comparing the MRC outputs to the domain-specific training outputs;
    based on a degree of similarity between (a) the MRC-generated outputs and (b) the domain-specific training outputs, separating a subset of the pair-wise inputs and outputs of the domain-specific dataset as a group from the rest of the pair-wise inputs and outputs wherein the subset includes at least two pairs of the pair-wise inputs and outputs; and
    retraining the MRC model on data comprising the separated subset of the pair-wise inputs and outputs of the domain-specific dataset.

2. The method of claim 1, wherein the generic dataset spans multiple knowledge domains.

3. The method of claim 1, wherein the MRC model is a question-answer machine learning model, the method further comprising, subsequent to the retraining:
    receiving, by the question-answer machine learning model, a question; and
    based on the retraining, automatically generating, by the question-answer machine learning model, an answer to the question.

4. The method of claim 1, wherein the comparing comprises:
    generating a similarity score for the MRC outputs and the domain-specific training outputs; and
    determining that the similarity score satisfies a threshold.

5. The method of claim 4, wherein the similarity score is based at least in part on recall and precision of the MRC outputs.

6. The method of claim 1, the method further comprising:
    prior to the running the MRC model, automatically generating the domain-specific dataset from a domain-specific data.

7. The method of claim 6, wherein the automatically generating is performed by a synthesis network.

8. The method of claim 6, wherein the domain-specific dataset is rectified subsequent to the automatically generating the domain-specific dataset.

9. The method of claim 1, the method further comprising:
    deleting the separated subset from the domain-specific dataset to obtain a second domain-specific dataset;
    running the MRC model using second training inputs from the second domain-specific dataset to obtain second MRC outputs, the second domain-specific dataset comprising a second plurality of pair-wise inputs and outputs;
    comparing the second MRC outputs to the second domain-specific training outputs;
    based on the comparing, separating a second subset of the pair-wise inputs and outputs of the second domain-specific dataset; and
    retraining the MRC model on data comprising the separated second subset.

10. A non-transitory computer readable medium comprising instructions to be executed in a processor of a computer system, the instructions when executed in the processor cause the computer system to carry out a method of training a machine reading comprehension (MRC) model, the method comprising:
    training the MRC model on a generic dataset;
    running the MRC model using domain-specific training inputs from a domain-specific dataset to obtain MRC outputs, the domain-specific dataset comprising a plurality of pair-wise inputs and outputs, the pair-wise inputs and outputs comprising the domain-specific training inputs and domain-specific training outputs arranged in a pair-wise manner;
    comparing the MRC outputs to the domain-specific training outputs;
    based on a degree of similarity between (a) the MRC-generated outputs and (b) the domain-specific training outputs, separating a subset of the pair-wise inputs and outputs of the domain-specific dataset as a group from the rest of the pair-wise inputs and outputs wherein the subset includes at least two pairs of the pair-wise inputs and outputs; and
    retraining the MRC model on data comprising the separated subset of the pair-wise inputs and outputs of the domain-specific dataset.

11. The non-transitory computer readable medium of claim 10, wherein the generic dataset spans multiple knowledge domains.

12. The non-transitory computer readable medium of claim 10, wherein the MRC model is a question-answer machine learning model, the method further comprising, subsequent to the retraining:
    receiving, by the question-answer machine learning model, a question; and
    based on the retraining, automatically generating, by the question-answer machine learning model, an answer to the question.

13. The non-transitory computer readable medium of claim 10, wherein the comparing comprises:
    generating a similarity score for the MRC outputs and the domain-specific training outputs; and
    determining that the similarity score satisfies a threshold.

14. The non-transitory computer readable medium of claim 13, wherein the similarity score is based at least in part on recall and precision of the MRC outputs.

15. The non-transitory computer readable medium of claim 10, the method further comprising:
    prior to the running the MRC model, automatically generating the domain-specific dataset from a domain-specific data.

16. The non-transitory computer readable medium of claim 15, wherein the automatically generating is performed by a synthesis network.

17. The non-transitory computer readable medium of claim 15, wherein the domain-specific dataset is rectified subsequent to the automatically generating the domain-specific dataset.

18. The non-transitory computer readable medium of claim 10, the method further comprising:
- deleting the separated subset from the domain-specific dataset to obtain a second domain-specific dataset;
- running the MRC model using second training inputs from the second domain-specific dataset to obtain second MRC outputs, the second domain-specific dataset comprising a second plurality of pair-wise inputs and outputs;
- comparing the second MRC outputs to the second domain-specific training outputs;
- based on the comparing, separating a second subset of the pair-wise inputs and outputs of the second domain-specific dataset; and
- retraining the MRC model on data comprising the separated second subset.

19. A computer system comprising:
- a machine reading comprehension (MRC) model;
- a generic dataset;
- a domain-specific dataset; and
- a processor, wherein the processor is programmed to carry out a method of training the MRC model, the method comprising:
  - training the MRC model on the generic dataset;
  - running the MRC model using domain-specific training inputs from the domain-specific dataset to obtain MRC outputs, the domain-specific dataset comprising a plurality of pair-wise inputs and outputs, the pair-wise inputs and outputs comprising the domain-specific training inputs and domain-specific training outputs arranged in a pair-wise manner;
  - comparing the MRC outputs to the domain-specific training outputs;
  - based on a degree of similarity between (a) the MRC-generated outputs and (b) the domain-specific training outputs, separating a subset of the pair-wise inputs and outputs of the domain-specific dataset as a group from the rest of the pair-wise inputs and outputs wherein the subset includes at least two pairs of the pair-wise inputs and outputs; and
  - retraining the MRC model on data comprising the separated subset of the pair-wise inputs and outputs of the domain-specific dataset.

20. The computer system of claim 19, wherein the generic dataset spans multiple knowledge domains.

* * * * *